Patented Feb. 24, 1953

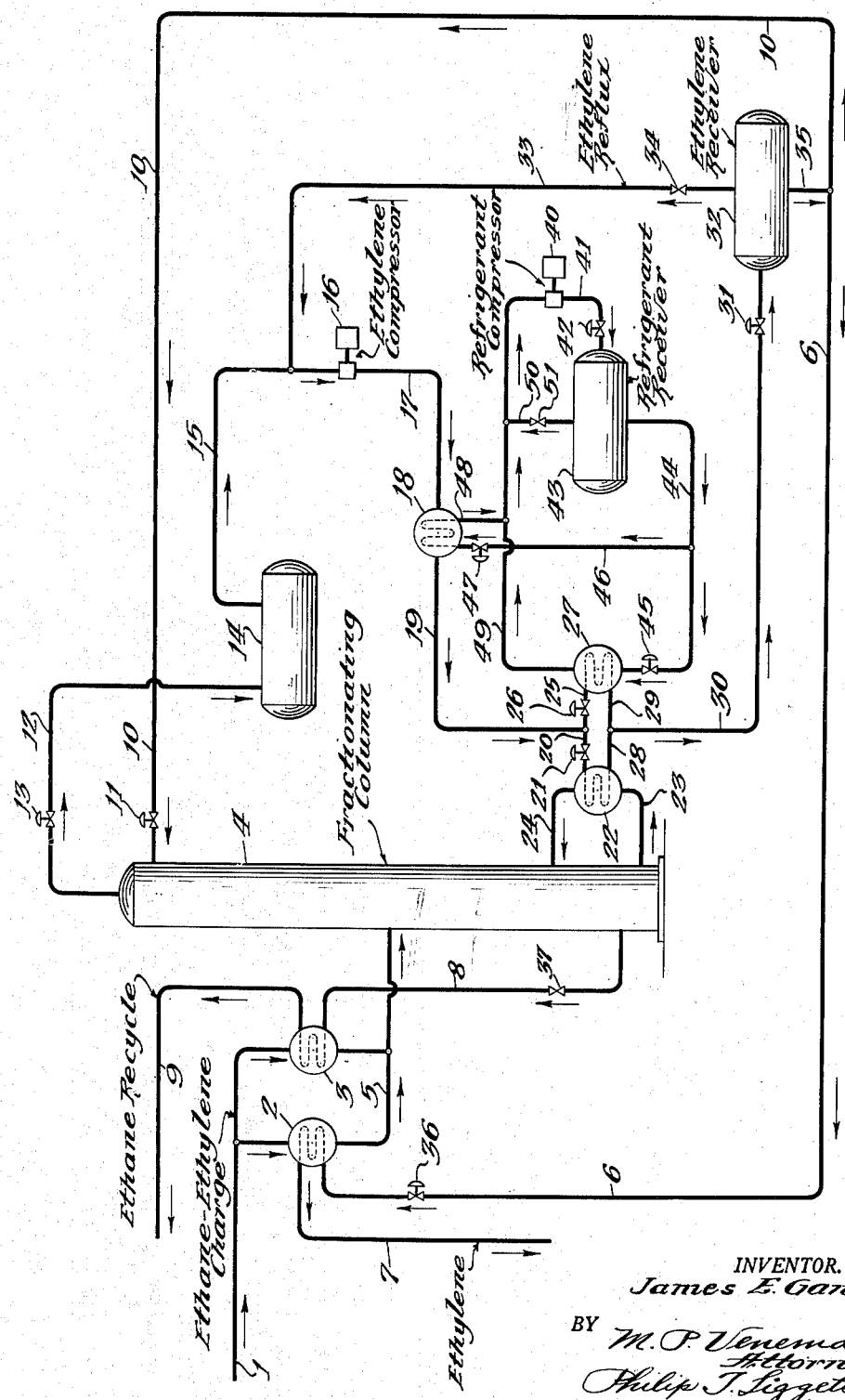

2,629,239

UNITED STATES PATENT OFFICE 2,629,239

SEPARATION OF CLOSELY BOILING FRACTIONS FROM A BINARY MIXTURE

James E. Gantt, Elmwood Park, Ill., assignor to Universal Oil Products Company, Chicago, Ill., a corporation of Delaware Application August 26, 1949, Serial No. 112,634

8 Claims. (Cl. 62—175.5)

This invention relates to an improved method for fractionating and separating closely boiling fractions of a binary mixture, such as from a mixture of ethane and ethylene or propane and propylene, which may be obtained from a preliminary fractionating and separating operation. More specifically, the operation is directed to an improved method of separation and recovery of a desired fraction, where separation is normally difficult because of a low relative volatility of the fractions of the given mixture. For example, the recovery of ethylene from a mixture which is substantially rich in ethane and ethylene and which has been obtained by a preliminary separating process such as "hypersorption," which employs a moving bed of activated carbon granules to absorb a heavier hydrocarbon and effect a preliminary separation.

It is a principal object of the present invention to provide an operation that is carried out in a novel manner permitting use of optimum thermodynamic conditions, effecting an overall economy through utilization of compression heating cycle for reboiling and condensing a large part of the reflux requirements.

It is also an object of the invention to provide an economical separation and recovery operation by reducing the net cooling requirements through effecting the greater portion of the cooling at a relatively high temperature level.

It is a still further object of the present invention to provide a flow scheme and suitable pressure conditions which effect a reduction in the overall compression requirements of the process, and eliminates the use of auxiliary pumps.

The present process is of particular advantage over the usual and conventional fractionating methods, in that it is not only more economical from a thermodynamic standpoint, but is of advantage in reducing the size of apparatus and equipment. The improved process permits a fewer number of trays and a substantially smaller fractionating column, or ultimately, frequently permits the use of a single fractionating column where under the conventional method two fractionating columns maintained in a series operation would be necessary to effect the desired fractionation and separation of the mixture for a given plant.

The usual or conventional method of separating ethylene from ethane in a fractionating operation is effected at a high pressure of the order of 400 p. s. i. g. or higher, with a temperature of the order of 0° F. at the top of the column and a temperature of the order of 40° F. at the bottom thereof. The usual arrangement also requires an overhead condenser, receiver and reflux pump, with a refrigerant utilized in the condenser to provide a reflux stream. A part of the refrigerant cooling and condensation may be carried out in the reboiler, but in general the cooling requirements are high and the operating costs correspondingly large. Under the improved flow and operating conditions of this invention, the ethylene-ethane separation may be carried out at a substantially lower pressure, that is below 300 p. s. i. g., in the separation column, and preferably being of the order of 200 p. s. i. g. (pounds per square inch gage), and the temperature being of the order of —35° F. at the top of the column and of the order of 0° F. at the bottom of the column. Although this temperature is substantially lower than used in prior methods it is above that which is commonly referred to as deep refrigerating temperatures. The lower pressure and temperature operation permits the use of a single and shorter column with fewer fractionating trays, as well as lower reflux requirements. Further, as will hereinafter be more fully described and explained, through the use of a compression heating cycle (compression heating as used here refers to the thermodynamic cycle involving compression of a vapor through such a range as to permit its condensation by indirect heat exchange with its own or a slightly higher boiling liquid phase, thus producing vapor without expending latent heat), wherein the lighter overhead products stream is compressed and liquefied in a reboiler at the lower end of the column, there is an approach to an optimum thermodynamic operation.

Broadly, the present invention relates to an improved method of separating fractions having a low relative volatility from a binary mixture of two closely boiling fractions, which comprises, cooling the charge mixture, subsequently introducing the cooled mixture at a relatively low pressure to a fractionating and separating zone and therein fractionating the mixture in the presence of a cold reflux stream of the lower boiling fraction which is obtained as hereinafter described, discharging the heavier or higher boiling fraction from the lower portion of the fractionating zone, withdrawing a stream of the lighter or lowest boiling fraction from the upper portion of the zone, compressing the last mentioned lighter stream to a relatively high superatmospheric pressure and passing the resulting compressed stream in indirect heat exchange with a liquid phase in the lower portion of the fractionating zone and reboiling liquid therein while simultaneously cooling and condensing the compressed stream, passing the resulting condensed stream of the desired lighter fraction to a receiving zone maintained at a reduced pressure and effecting a further reduction of temperature, withdrawing a resulting substantially pure light fraction from the lower portion of the receiving zone and returning at least a portion thereof to the fractionating and separating zone as aforesaid reflux stream. Where process requirements permit, the net overhead product may be withdrawn as a gas thus reducing the amount of heat to be removed from the overhead stream.

In a more specific embodiment, the present improved method provides for recovering ethylele from an ethylene-ethane mixture, comprising the steps of passing the mixture at a pressure of less than 300 p. s. i. g. in heat exchange relationship with resulting product streams and effecting a cooling of the mixture to below 0° F., introducing the thusly cooled mixture to a separating and fractionating column and fractionating the mixture in the presence of a cold reflux stream of ethylene obtained as hereinafter described, discharging an ethane stream from the lower portion of the column, withdrawing an ethylene stream from the upper portion of the column, compressing the ethylene stream and effecting a temperature rise to the order of 100° to 150° F., passing the hot compressed gas in indirect heat exchange with a cooling medium, subsequently passing the partially cooled stream in indirect heat exchange with the liquid phase in the lower portion of the separating and fractionating zone and effecting condensation of an appreciable part of the ethylene stream while supplying heat for reboiling within the lower portion of the fractionating zone, subsequently effecting a pressure reduction of a cooled and condensed ethylene stream and passing the resulting cold stream to a receiving zone maintained at a reduced pressure whereby to effect the cooling of the latter stream to a temperature below 0° F., withdrawing a portion of the resulting substantially pure ethylene stream from the lower portion of the receiving zone and passing it in heat exchange relationship with the mixed stream being introduced to the separating zone as hereinbefore described, and returning at least a portion of the substantially pure and cold ethylene stream to the upper end of the fractionating and separating zone as the aforesaid reflux stream.

In a preferable operation, suitable for effecting the greatest economy, the feed stream is cooled to the order of —20° F. and introduced at a pressure of the order of 200 p. s. i. g., while the subsequent compression and condensing of the ethylene stream is effected at a pressure of the order of 550 to 600 p. s. i. g. to provide a temperature after compression of the order of 100°–150° F. as hereinbefore noted.

The external cooling provided after the compression of the product stream is preferably provided by a refrigerant type of medium capable of being handled in a conventional heat exchanger and suitable to reduce the temperature of the compressed stream from about 150° F. to about 60° F., thus the greater amount of the net cooling is effected at a relatively high level where greater cooling efficiency is obtainable, with an accompanying reduction in cooling and operating costs. Further relatively high level cooling of the product stream is effected in the heat exchange chamber or reboiler connecting with the lower portion of the fractionating column, while the further pressure reduction upon entering the ethylene receiver, provides the desired low temperature stream. The resulting ethylene stream at the receiver is preferably of the order of —20° F. and about 250 p. s. i. g. The product stream at this temperature and pressure is thus sufficient to provide the desired cooling of the charge stream being introduced to the fractionating and separating column, as well as provide a cold reflux stream to the upper portion of the column, which upon further reduction in pressure, to the order of 200 p. s. i. g., effects a desired low temperature reflux.

The ethane stream withdrawn from the lower portion of the separating column, may also, if desired, be passed in heat exchange relationship with the charge stream to the fractionating column in order to provide in conjunction with the ethylene product stream the desired cooling of the charge stream to an introduction temperature of the order of —20° F.

In another specific embodiment of the present invention, the improved method of fractionation may be utilized for the separation and recovery of propylene from a binary mixture of propane and propylene, with the steps comprising passing the charge mixture in a heat exchange relationship if desired with at least a portion of the resulting separated component streams and effecting a cooling of the mixture to a temperature below about 15° F., subsequently introducing the cooled mixture at a pressure of less than 100 p. s. i. g. to a fractionating and separating zone and fractionating the mixture in the presence of a cold reflux stream of propylene obtained as hereinafter described, discharging propane from the lower portion of the zone and withdrawing a propylene stream from the upper portion thereof, compressing the latter stream to a superatmospheric pressure sufficient to elevate the temperature of the stream to a temperature of from 35° F. to 50° F., passing the compressed stream in indirect heat exchange with a liquid phase in the lower portion of the fractionating zone and reboiling the latter while simultaneously cooling and condensing the propylene stream, passing the condensed propylene stream to a receiving zone maintained at a reduced pressure and effecting the cooling of the propylene to a temperature below 15° F., and withdrawing the resulting substantially pure propylene stream from the lower portion of the receiving zone and returning at least a portion thereof to the fractionating zone as the aforesaid reflux stream.

Preferably, in a propylene-propane separation, the fractionating column is maintained at a superatmospheric pressure of the order of about 50 p. s. i. g. and the feed mixture is introduced to the column at a temperature of about 5° F. A relatively high reflux to feed ratio is maintained of the order of about 7 to 1 and the reflux temperature is of the order of about 0° F., whereby the overhead propylene passing to the compressor is at about 0° F., while the propane being withdrawn from the lower end of the fractionating column is of the order of 15° F. Also, as in the the case of the ethylene-ethane separation, a compressing and condensing of the propylene stream is effected, in this operation to a pressure of the order of 100 p. s. i. g. to provide a temperature after compression of the order of 35° F. to 50° F., permitting condensation by indirect heat exchange in the reboiler to the liquid in the lower portion of the fractionating column. A subsequent reduction of the reflux stream to the order of 50 p. s. i. g. maintained in the fractionating zone effects the reduction of the temperature of the reflux stream to the order of 0° F.

The present improved process, utilizing lower than conventional pressures and temperatures for effecting the separation of the binary mixtures, is of particular advantage in that the compression heating or auto-refrigeration method being utilized permits higher thermodynamic efficiencies. However, excessively low temperatures within the fractionating column, that is temperatures within the range of deep-refrigeration, would require the necessity of alloy metals and eliminate the present use of carbon steel for the fractionating column as well as for other portions of the unit. It is of course necessary or desirable to carry out the conventional, as well as the present improved operation, on a substantially dry charge stream because of the below freezing temperature range.

Reference to the accompanying drawing will serve to further clarify the novel operation and flow of the present invention, while the explanation and description thereof will indicate additional features and advantages obtained by this method of separation.

In order to make more understandable the operation and flow of the present improved fractionating process, it will be assumed that an ethane-ethylene mixture is being charged to the fractionating unit for the recovery of a desired ethylene fraction. Referring now to the drawing, a charge stream of the ethane-ethylene mixture passes through line 1, in accordance with a preferred operation, at a pressure of the order of 200 p. s. i. g. and is cooled within the heat exchangers 2 and 3 so that the mixture is introduced into the fractionating column 4 through the feed line 5 at a low temperature of the order of −20° F. As indicated diagrammatically, the feed stream is split between the two heat exchangers 2 and 3, a portion of the feed stream being cooled by a product stream of ethylene which is charged to the heat exchanger 2 by way of line 6 and subsequently discharged therefrom by way of line 7, while an ethane stream recovered from the lower end of column 4 is charged to the heat exchanger 3 by way of line 8 and subsequently removed therefrom by way of line 9. It is thus seen that the resulting product streams are utilized to cool the charge stream of ethane and ethylene prior to their introduction into the column 4. In the present embodiment, the overhead product condensation is provided for intermediate liquid storage. However, if no storage is necessary, the ethylene may be produced as a gas.

The fractionating column 4 may be a conventional vertically disposed vessel having suitable bubble decks or trays spaced throughout its height to effect a desired substantially clean separation between the ethylene and ethane components being charged through the column. The column is maintained at a superatmospheric pressure of the order of 200 p. s. i. g., with a bottoms temperature of the order of 0° F. and a top temperature of the order of −35° F. The ethylene-ethane separation is carried out in the presence of a reflux stream of substantially pure liquid ethylene charged to the upper end of the column by way of line 10 having control valve 11, the reflux stream being supplied as a portion of the product stream, as will be subsequently pointed out. The net overhead stream of ethylene vapor is withdrawn by way of line 12 having control valve 13 and passed to a suitable suction drum 14. The vapor stream subsequently passes by way of line 15 to compressor 16 which serves to raise the pressure thereof from 200 p. s. i. g. to a high superatmospheric pressure of the order of 550 to 600 p. s. i. g. The ethylene stream with heat of compression passes from the compressor 16 by way of line 17 to a suitable heat exchanger or cooler 18 supplied with a suitable cooling medium, preferably a refrigerant. Although not indicated in the drawing, a stage of water cooling may be utilized prior to passing the liquefied stream to the exchanger 18 as there will normally be some excess heat in this operation. The heat of compression raises the temperature of the product stream passing in line 17 to a temperature of the order of 100° F. to 150° F. The stream is partially cooled in exchanger 18 to a temperature of the order of 60° F. and is passed therefrom to the reboiler section by way of line 19.

A portion of the remaining heat of compression and condensation is utilized to supply heat and reboil the bottoms in the fractionating column 4 with ethylene passing by way of line 20 and valve 21 to the heat exchanger 22 for indirect heat exchange with the bottoms or ethane being circulated through exchanger 22 by means of lines 23 and 24. Where excess heat is available, a portion of the ethylene stream passes through line 25 and valve 26 to a refrigerant heat exchanger 27 so that additional heat may be given up. Resulting cooled streams are withdrawn from each of the exchangers by way of lines 28 and 29, such that a combined stream passes by way of line 30 and control valve 31 to an ethylene receiver 32.

The overhead product stream is thus used in a manner to supply heat from the heat of compression and condensation for reboiling the bottoms of the column while, subsequently upon reducing pressure through valve 31 there is provided a cold stream suitable to effect, by means of heat exchange, a cooled charge stream to the fractionating column, and a cold reflux stream charged to the top of the column. In a normally designed plant, only one stage of compression is needed, with a compressor 16 suitable to provide the desired high pressure stream and the desired flow through each of the process lines, the pressure from compression being such that all normally required pumps and the like are eliminated.

In accordance with the preferred conditions of operation, the heat of compression is dissipated at a relatively high level, through the heat exchangers 18, 22 and 27, so that the resulting stream charged to the receiver by way of line 30 is at a temperature of the order of 25° F. Pressure is then reduced on the liquid condensate upon its introduction into the receiver 32, with valve 31 serving as a pressure reducing valve suitable to lower pressure from the order of 550–600 p. s. i. g. into the receiver 32 which is maintained at about 250 p. s. i. g.

Vaporized material resulting in the receiver 32 may be passed by way of line 33 and valve 34 to line 15 which is in turn connected with the intake of the compressor 16. The liquid condensate is withdrawn from the lower end of the receiver by way of line 35, and as hereinbefore noted, a portion thereof is passed by way of line 10 and valve 11 to the upper portion of the fractionating column 4 in order to provide a cold reflux stream for the fractionation and separation within the column. The ethylene stream leaves the receiver 32 at approximately 250 p. s. i. g. and a temperature of approximately —20° F., such that it enters the upper end of the column maintained at approximately 200 p. s. i. g., the reflux portion is still further cooled and the reflux enters the column at a temperature approximating a —35° F. temperature.

The product stream is passed by way of line 35 and line 6 through a control valve 36, which is placed in the line at the inlet to the exchanger 2, and as noted hereinabove, the cold product stream furnishes a cooling medium for the charge mixture entering the unit by way of line 1. Preferably, the product stream is reduced in pressure only a relatively small amount, from the order of 250 p. s. i. g. to approximately 200 p. s. i. g., or to a slightly lower pressure if additional cooling is required in the heat exchange operation. The resulting product stream which is discharged from exchanger 2 by way of line 7 may, if desired, be compressed prior to passing it to storage, or other suitable processing apparatus.

The bottoms from the fractionating column 4 comprises a substantially pure ethane stream, and as noted hereinafter, it is continuously withdrawn from the lower end of the column at a temperature of about 0° F. and at the column pressure of the order of 200 p. s. i. g. The stream passes by way of line 8 and control valve 37, through heat exchanger 3 in indirect heat exchange with a portion of the mixed charge stream. Where the present separation and recovery operation is utilized in connection with a unit providing a preliminary separation of the ethane and ethylene components from a mixed stream, such as a hypersorption unit, then substantially all of the ethane stream may be returned as recycle to a reaction zone, the effluent from which is charged to the hypersorption unit.

While the present operation is of particular advantage over the higher pressure fractionation process normally utilized with ethane-ethylene separation, there is a certain amount of net cooling which it is desirable to maintain available in order to insure proper removal of heat of compression as well as insure a balanced system. In this unit, a refrigerant is indicated as being used in heat exchanges 18 and 27, and while it is not intended to limit the type of refrigerant to any one compound or mixture, propane, ammonia or the like, may well be used and maintained in a closed system. The refrigerant is compressed in a suitable compressor indicated at 40, and is discharged therefrom by way of line 41 having control valve 42, which in turn discharges the material into a suitable refrigerant receiver 43. Condensed refrigerant leaves the lower portion of receiver 43 by way of line 44, from which a portion thereof is passed through a pressure reducing valve 45 to heat exchanger 27, and another portion thereof passed by way of line 46 and a pressure reducing valve 47 to a heat exchanger 18. Resulting vaporized streams are removed from each of the exchangers 18 and 27 through the respective lines 48 and 49 and the material continuously returned to the suction side of the compressor 40. A vent from the top of receiver 43 is also provided by means of the conduit 50 and valve 51 such that uncondensed refrigerant may be vented into the compressor suction line 49 and thereby returned to the refrigeration system.

In order to further point out the advantage of the present operation, it may be noted that the refrigerant is utilized to lower the temperature of the compressed product stream passing by way of line 17 and heat exchanger 18, from a relatively high level temperature of the order of 100° F. to approximately 60° F., as well as to provide in conjunction with the reboiler 32 additional cooling that may be utilized to reduce the temperature of the net product stream to the order of approximately 25° F. prior to its introduction into the ethylene receiver 32 at a reduced pressure. The net cooling necessary is substantially less than that in a conventional operation which utilizes a refrigerant at the top of an ethylene separation column, where reflux must be condensed by the use of a cold refrigerant. Two stages of compression generally are necessary to effect the desired cooling, with temperatures of the order of —20° F. or lower required, such that a cooling water is of relatively no utility or advantage. The present refrigeration system with compressor 40 is indicated as a single stage operation. However, where it is desired for purposes of economy, a two-stage refrigeration arrangement may be utilized, one stage of compression connecting with the outlet from one exchanger such as exchanger 18, while another stage of compression takes suction from the other exchanger 27, with the first stage of compression combining with a second stage in a manner to reduce pressure requirements.

It may be again pointed out that the present operation is of advantage and provides a particularly economical operation, in that the compression of the overhead product stream provides heat which is utilized at the reboiler 32 and at the same time permits an integral refrigeration operation wherein the product is lowered in temperature for pre-cooling the charge stream and for production of a cold reflux stream. Where the fractionating column is maintained at a pressure substantially above the 200 p. s. i. g. pressure, say 250 p. s. i. g. or higher, it then becomes impractical and at higher pressures impossible to utilize the present arrangement where compression can be utilized for reboiling and condensing a large part of the reflux requirements.

Where a pressure of less than 200 p. s. i. g. is utilized in the fractionating column 4, for ethylene separation then there is theoretically a further reduction in reflux requirements, as well as a possible reduction in the size and diameter of the column itself; however, the 200 p. s. i. g. limit provides a practical range, in that the lower pressure and lower temperatures approaching deep refrigeration would require the use of alloys in the column itself, as well as in all connecting equipment. Thus, the use of expensive alloys and other contingencies encountered in substantially lower temperatures for the refrigeration cycle more than offset any possible advantages which may be obtained with going to a lower pressure within the separating column.

While the accompanying drawing provides a diagrammatic flow and method of operation, it should be understood that the process is not limited to an ethylene-ethane separation, for it is equally applicable to other homologue and isomer separations, such as the aforementioned propylene-propane separation and the like. It should also be understood that it is not intended to limit the invention to the exact diagram which has been shown, with respect to the physical arrangement, or as to relative sizes of equipment, and the like. Further, while the foregoing temperatures and pressures provide the approximate range for carrying out a preferred operation, it should be understood that in any fractionating unit of this type, reasonable and minor variations in temperature and pressure may be utilized to effect an efficient and uniform recovery unit. The principal advantage of the present improved method of operation or flow is obtained through the use of the compression heating and autothermic refrigeration, that is, compressing the overhead stream sufficiently to permit high level cooling and condensation or partial condensation within a reboiler utilized to effect heating in the fractionating column, as well as the utilization of a high reflux ratio of a cooled stream of a portion of the product stream, which is returned to the upper end of the fractionating zone.

I claim as my invention:

1. An improved method of separating and recovering fractions having a low relative volatility from a binary mixture, which comprises, cooling said mixture and subsequently introducing the cooled mixture at a relatively low fractionating pressure to a fractionating and separating zone, fractionating said mixture in said zone in the presence of a cold reflux stream of the lower boiling fraction which is obtained as hereinafter described, discharging the higher boiling fraction from the lower portion of the fractionating zone, withdrawing a stream of the lower boiling fraction from the upper portion of said fractionating zone, compressing the latter fraction to a substantially higher superatmospheric pressure and effecting the heating thereof, passing the resulting compressed stream in indirect heat exchange with the liquid phase in the lower portion of the fractionating zone and reboiling liquid therein while simultaneously cooling and condensing the compressed stream, reducing the pressure on the resulting condensed stream of the desired lighter fraction to effect a further temperature reduction and introducing the same to a receiving zone maintained at the reduced pressure and therein separating gas from liquid, withdrawing resulting substantially pure liquid fraction from the lower portion of the receiving zone and returning a portion thereof to the fractionating and separating zone as said reflux stream and passing another portion thereof in indirect heat exchange with said mixture undergoing cooling as aforesaid.

2. The fractionating method of claim 1 further characterized in that said binary mixture is an ethylene-ethane mixture with the ethylene comprising the lower boiling fraction and the ethane comprising the higher boiling fraction, said binary mixture is charged to the fractionating zone at a temperature below 0° F., and at a pressure at less than 300 p. s. i. g., the ethylene fraction being withdrawn from the upper portion of the fractionating column is compressed to a substantially high superatmospheric pressure sufficient to effect the heating of the stream to a temperature of the order of 100° to 150° F., and the resulting partially condensed ethylene stream obtained after the indirect heat exchange with the liquid fraction in the lower portion of the fractionating zone is reduced in pressure in the receiving zone sufficiently to effect the cooling of the ethylene stream to a temperature below 0° F.

3. The improved method of claim 1 further characterized in that said binary mixture is a propylene-propane mixture with the lower boiling fraction being propylene and the higher boiling fraction being propane, the mixture is introduced to the fractionating zone at a temperature below 15° F. and the fractionating zone is maintained at a pressure of less than 100 p. s. i. g., the lower boiling propylene stream being withdrawn from the upper portion of the fractionating zone is compressed to a substantially high superatmospheric pressure sufficient to effect the heating of the stream to a temperature of the order of 35° F. to 50° F., and the partially cooled propylene stream resulting from the indirect heat exchange with a liquid in the lower portion of the fractionating column is reduced in pressure in the receiving zone sufficiently to effect the cooling of the propylene to a temperature below 15° F.

4. An improved method for recovering ethylene from an ethylene-ethane mixture which comprises, cooling said mixture to a temperature of about −20° F., subsequently introducing said cooled mixture at a pressure of the order of 200 p. s. i. g. to a fractionating and separating zone and fractionating said mixture therein in the presence of a cold reflux stream of ethylene obtained as hereinafter described, discharging ethane from the lower portion of said zone and withdrawing an ethylene stream from the upper portion thereof, compressing the latter stream to a superatmospheric pressure of the order of 500 to 600 p. s. i. g. and effecting the heating of said stream to a temperature of the order of 100° F. to 150° F., passing said compressed stream in indirect heat exchange with a liquid phase in the lower portion of said fractionating zone and reboiling the latter while simultaneously cooling and condensing said ethylene stream, passing the resulting condensed ethylene stream to a receiving zone maintained at a reduced pressure of the order of 250 p. s. i. g. and effecting the cooling of said stream to a temperature of the order of −20° F., separating gas from liquid in the receiving zone and withdrawing a resulting substantially pure liquid ethylene stream from the lower portion of said receiving zone, and returning at least a portion of the liquid ethylene stream to said separating zone as aforesaid reflux stream.

5. The method of claim 4 further characterized in that at least a portion of the ethane separated and withdrawn from the lower end of the fractionating and separating zone is passed in heat exchange relationship with said mixture being introduced into the separating zone, whereby to effect with said ethylene stream the cooling of said mixture to said low temperature of the order of −20° F.

6. An improved method for recovering propylene from a propane-propylene mixture which comprises, cooling said mixture to a temperature of the order of 0–15° F., subsequently introducing said cooled mixture at a pressure of the order of 50 p. s. i. g. to a fractionating and separating zone and fractionating said mixture therein in the presence of a cold reflux stream of propylene obtained as hereinafter described, discharging propane from the lower portion of said zone and withdrawing a propylene stream from the upper portion thereof, compressing the latter stream to a superatmospheric pressure of the order of 100 p. s. i. g. and effecting the heating of said stream to a temperature of the order of 30°–40° F., passing said compressed stream in indirect heat exchange with a liquid phase in the lower portion of said fractionating zone and reboiling the latter while simultaneously cooling and condensing said propylene stream, reducing the pressure on the resulting condensed propylene stream to effect a further temperature reduction and introducing the same to a receiving zone, separating gas from liquid in the receiving zone and subsequently withdrawing a resulting substantially pure liquid propylene stream from the lower portion of said receiving zone, and returning at least a portion of the liquid propylene stream to said separating zone as aforesaid reflux stream.

7. The process of claim 6 further characterized in that the ratio of said propylene reflux stream being returned to said fractionating zone with respect to said mixture being introduced thereto is a ratio of the order 7 to 1.

8. The method of claim 1 further characterized in that separated gas is withdrawn from the upper portion of said receiving zone and supplied to the compressing step wherein the lower boiling fraction from the upper portion of the fractionating zone is compressed.

JAMES E. GANTT.

REFERENCES CITED

The following references are of record in the file of this patent:

UNITED STATES PATENTS

| Number | Name | Date |
|---|---|---|
| 1,449,291 | Mewes et al. | Mar. 20, 1923 |
| 2,127,004 | Nelson | Aug. 16, 1938 |
| 2,270,852 | Schuftan | Jan. 27, 1942 |

FOREIGN PATENTS

| Number | Country | Date |
|---|---|---|
| 561,310 | Germany | Oct. 13, 1932 |